No. 658,663. Patented Sept. 25, 1900.
W. H. H. LUNDY.
INSECT TRAP.
(Application filed June 1, 1900.)
(No Model.)
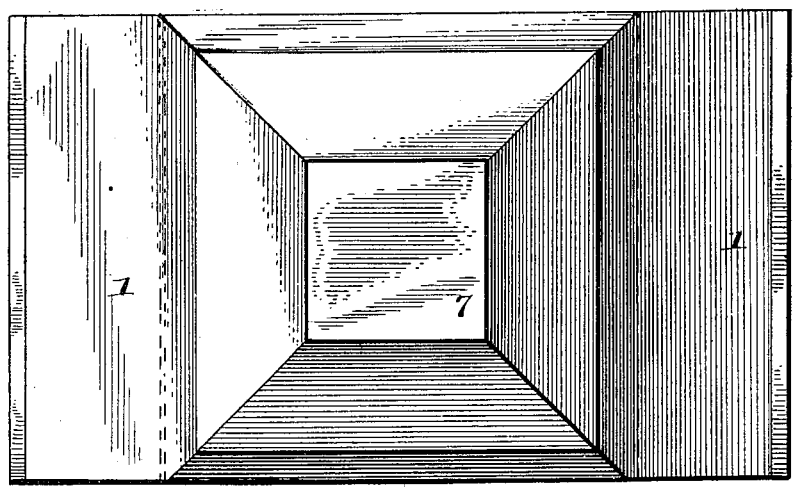
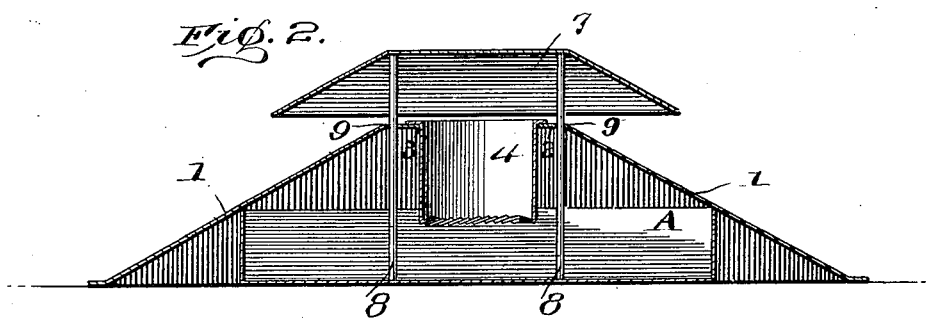
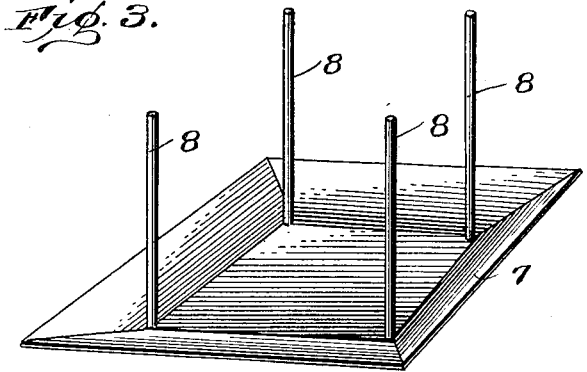
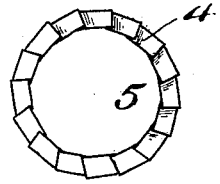
Witnesses
E. W. Hart.
Ralph S. Warfield.
William H. H. Lundy, Inventor
by Rhesa G. DuBois & Co.
his Attorneys.

UNITED STATES PATENT OFFICE.

WILLIAM H. H. LUNDY, OF WASHINGTON, DISTRICT OF COLUMBIA.

INSECT-TRAP.

SPECIFICATION forming part of Letters Patent No. 658,663, dated September 25, 1900.

Application filed June 1, 1900. Serial No. 18,731. (No model.)

*To all whom it may concern:*

Be it known that I, WILLIAM H. H. LUNDY, a citizen of the United States of America, residing at Washington, in the District of Columbia, have invented certain new and useful Improvements in Insect-Traps, of which the following is a specification.

My invention relates to an improvement in insect-traps, it being adapted more especially for catching roaches; and the object is to provide a simple and inexpensive article of the character specified which will be effectual in catching these insects and preventing their escape when once caught.

With this object in view my invention consists in certain novel features of construction and combinations of parts, which will be hereinafter more fully described, and particularly pointed out in the claims.

In the accompanying drawings, Figure 1 is a plan view. Fig. 2 is a longitudinal vertical section, and Figs. 3 and 4 are detail views.

A represents a box preferably made of sheet metal and rectangular in shape, although the particular material employed and the shape of the article are of no great consequence. Over the top of the box or receptacle A a cover is permanently secured by preference, and this cover is flat at the apex and from the edges of this portion slopes to the edges of the box or receptacle in top directions and on down to the plane of the bottom of the box or receptacle on the two intermediate sides 1 1 to the floor, these latter sides 1 1 serving as inclines for the rodents to crawl up upon from the floor and the inner surface, which acts as a top or ceiling to the box or receptacle, being of sufficient slope to prevent a roach from crawling on its surface.

In the center of the flat apex 2 a hole 3 is formed, and in this a removable food-holder 4 is adapted to fit. This food-holder is in the form of a thimble, preferably slitted at the bottom and bent inwardly to form an inturned flange, upon which the food is placed to entice the insects into the trap. These several projections may be soldered together to make one continuous flange or not, as desired. The width of this flange, while sufficient to hold the food, is still narrow enough to afford an ample-sized opening 5 for the insect to drop through when they attempt to reach the food into the box or receptacle below. The upper edge of this food-holder has an outturned annular flange 6, which supports it upon the edge of the flat apex of the trap.

As it is a characteristic of roaches and many other insects to seek a place under which to crawl, I provide the hood 7, which preferably conforms in shape to the pyramidal form of the top of the trap and is adapted to come down to within a short distance thereof, just leaving ample space for the insects to pass through into the feed-holder. This hood is preferably removable from the trap and for this purpose is provided with dowel-pins 8 8, which enter holes 9 9, provided therefor in the flattened apex of the trap.

When the trap is sufficiently filled with insects and it is desired to dispose of them, the hood is removed and the food-holder taken out, and by turning the trap over the insects fall out through the hole 3, the sloping cover of the box or receptacle facilitating this action.

To set the trap, the several parts are assembled and food or bait is placed on the lower flange of the food-holder. This attracts the insects, which easily find their way up the sides 1 1 to the edge of the food-holder. In reaching down they loose their hold and immediately fall into the box or receptacle, from which it is absolutely impossible for them to escape, owing to the shape of the interior, the obstruction afforded by the depending food-holder and its inturned flange, over which they find it impossible to crawl.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. An insect-trap consisting of a box or receptacle having a top with an opening in it, and a food-holder depending into the opening and provided with a food-holding device, and a hood removably secured over the top of the trap.

2. An insect-trap consisting of a box or receptacle, having a top with an opening in it, and a hood having dowel-pins of sufficient length to extend through the top and engage the bottom of the box or receptacle to regulate the height of the hood above the top.

3. An insect-trap consisting of a box or receptacle having a top, the sides of which incline to afford a passage-way for insects over them, said top having an opening therein and a food-holder removably held in the opening and provided with an inturned flange in its interior to receive food or bait thereon and a hood removably secured over the top of the trap.

4. In an insect-trap, the combination with a box or receptacle having a sloping top or cover with a flattened apex and a portion of which top or cover comes to a point on a plane with the bottom of the box or receptacle to afford a passage-way for insects thereon, the flattened apex having a hole therein, of a food or bait holder consisting of a thimble fitted in this hole and removable therefrom, this food-holder having an inturned flange at its lower end and an outwardly-extending flange at its upper end whereby to support it, and a hood conforming in shape to the top or cover, substantially, said hood having dowels which enter holes formed therefor in the top or cover as a means for removably holding it in place.

5. An insect-trap consisting of a box or receptacle having an opening in its top, and a cup-shaped device depending through the opening into the box or receptacle, said cup-shaped device extending only part way to the bottom of the box or receptacle whereby to permit insects to enter the box or receptacle and prevent their escape therefrom.

In testimony whereof I have signed my name to this specification in the presence of two subscribing witnesses.

WILLIAM H. H. LUNDY.

Witnesses:
NAOMI BAKER,
CAROLINE B. NORMAN.